United States Patent
Macholdt et al.

[11] Patent Number: 6,143,455
[45] Date of Patent: Nov. 7, 2000

[54] USE OF ALUMINUM AZO COMPLEX DYES AS CHARGE CONTROL AGENTS

[75] Inventors: Hans-Tobias Macholdt, Darmstadt-Eberstadt; Ruediger Baur, Eppstein, both of Germany

[73] Assignee: Clariant GmbH, Frankfurt, Germany

[21] Appl. No.: 09/354,806

[22] Filed: Jul. 16, 1999

[30] Foreign Application Priority Data

Jul. 18, 1998 [DE] Germany ............... 198 32 371

[51] Int. Cl.$^7$ ............... G03G 9/09; G03F 9/00; C09D 11/00; G11C 13/02; B32B 15/02
[52] U.S. Cl. ............... 430/106; 430/7; 430/110; 106/31.52; 106/496; 428/402; 307/400
[58] Field of Search ............... 430/7, 106, 110; 106/31.52, 496; 307/400; 428/402

[56] References Cited

U.S. PATENT DOCUMENTS

| | | | |
|---|---|---|---|
| 4,624,907 | 11/1986 | Niimura et al. | 430/106 |
| 4,845,003 | 7/1989 | Kiriu et al. | 430/110 |
| 4,873,185 | 10/1989 | Uchida et al. | 430/110 |
| 4,985,328 | 1/1991 | Kumagai et al. | 430/110 |
| 5,166,124 | 11/1992 | Weber | 430/7 |
| 5,378,269 | 1/1995 | Rossi et al. | 106/31.52 |
| 5,770,341 | 1/1995 | Mukudai et al. | 430/110 |

FOREIGN PATENT DOCUMENTS

| | | |
|---|---|---|
| 0 705 886 | 4/1996 | European Pat. Off. |
| 0 813 117 | 12/1997 | European Pat. Off. |

OTHER PUBLICATIONS

XP–002131280, Abstract for JP 04 107469 A.
Patent Abstract for EP 0 705 886.
Derwent Patent Family Abstract for EP 0 813 117.
XP–002131281, Abstract for JP 02 035465.

*Primary Examiner*—Roland Martin
*Attorney, Agent, or Firm*—Susan S. Jackson; Scott E. Hanf

[57] ABSTRACT

Aluminum azo complex dyes of the formula (I) or (I')

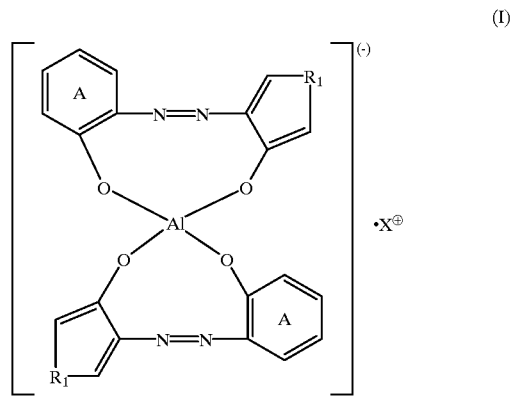

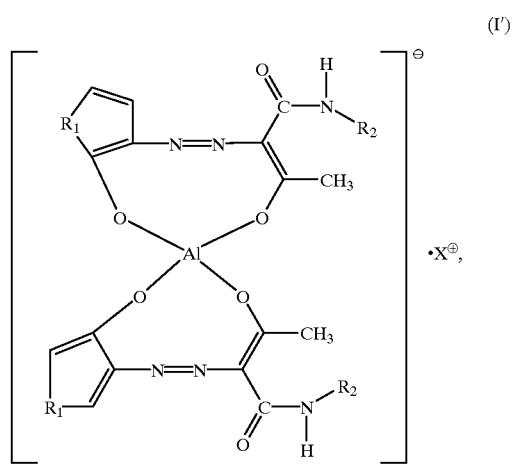

are used as charge control agents in electrophotographic toners and developers, powder coating materials, electret materials, color filters, electrostatic separation processes and in inkjet inks.

13 Claims, No Drawings

USE OF ALUMINUM AZO COMPLEX DYES AS CHARGE CONTROL AGENTS

CROSS-REFERENCES TO RELATED APPLICATIONS

The present invention is described in the German priority application No. 198 32 371.9, filed Jul. 18, 1998, which is hereby incorporated by reference as is fully disclosed herein.

BACKGROUND OF THE INVENTION

The present invention is in the technical field of charge control agents in toners and developers for electrophotographic recording processes, in powders and powder coating materials for surface coating, in electret materials, especially in electret fibers, in separation processes and in color filters.

In electrophotographic recording processes a latent charge image is produced on a photoconductor. This latent charge image is developed by applying an electrostatically charged toner which is then transferred to, for example, paper, textiles, foils or plastic and is fixed by means, for example, of pressure, radiation, heat or the action of solvent. Typical toners are one- or two-component powder toners (also known as one- or two-component developers); also used are specialty toners, such as magnetic toners, liquid toners or polymerization toners, for example. Polymerization toners are taken to mean those toners which are formed by, for example, suspension polymerization (condensation) or emulsion polymerization and lead to improved particle properties in the toner. Also meant are those toners produced in principle in nonaqueous dispersions.

One measure of the quality of a toner is its specific charge q/m (charge per unit mass). In addition to the sign and level of the electrostatic charge, the principal, decisive quality criteria are the rapid attainment of the desired charge level and the constancy of this charge over an extended activation period. In addition to this, the insensitivity of the toner to climatic effects such as temperature and atmospheric humidity is a further important criterion for its suitability.

Both positively and negatively chargeable toners are used in copiers and laser printers, depending on the type of process and type of apparatus.

To obtain electrophotographic toners or developers having either a positive or negative charge, it is common to add charge control agents. Since the charge of toner binders is in general heavily dependent on the activation period, the function of a charge control agent is, on the one hand, to set the sign and level of the toner charge and, on the other hand, to counteract the charge drift of the toner binder and to provide for constancy of the toner charge.

Charge control agents which are not able to prevent the toner or developer from showing a high charge drift (ageing) during a prolonged period of use, and which may even cause the toner or developer to undergo charge inversion, are hence unsuitable for practical use.

Another important practical requirement is that the charge control agents should have sufficient thermal stability and good dispersibility. Typical temperatures at which charge control agents are incorporated into the toner resins, when using kneading apparatus or extruders, are between 100° C. and 200° C. Correspondingly, thermal stability at 200° C. is of great advantage. It is also important for the thermal stability to be ensured over a relatively long period (about 30 minutes) and in a variety of binder systems. This is significant because matrix effects occur again and again and lead to the premature decomposition of the charge control agent in the toner resin, causing the toner resin to turn dark yellow or dark brown and the charge control effect to be wholly or partly lost. Typical toner binders are polymerization, polyaddition and polycondensation resins, such as styrene, styrene-acrylate, styrene-butadiene, acrylate, polyester and phenol-epoxy resins, and also cycloolefin copolymers, individually or in combination, which may also include further components, examples being colorants, such as dyes and pigments, waxes or flow assistants, or may have these components added subsequently, such as highly disperse silicas.

For good dispersibility it is of great advantage if the charge control agent has minimal waxlike properties, no tackiness, and a melting or softening point of >150° C., more preferably >200° C. Tackiness leads frequently to problems in the course of the metered addition of the charge control agent to the toner formulation, and low melting or softening points may result in a failure to attain homogeneous distribution in the course of dispersing, since the material coalesces in droplets in the carrier material.

Apart from their use in electrophotographic toners and developers, charge control agents may also be used to improve the electrostatic charge of powders and coating materials, especially in triboelectrically or electrokinetically sprayed powder coatings as are used to coat surfaces of articles made from, for example, metal, wood, plastic, glass, ceramic, concrete, textile material, paper or rubber. Power coating technology is used, for example, when coating articles such as garden furniture, camping equipment, domestic appliances, vehicle parts, refrigerators and shelving and for coating workpieces of complex shape. The powder coating material, or the powder, receives its electrostatic charge, in general, by one of the two following processes:

In the corona process, the powder coating material or the powder is guided past a charged corona and is charged in the process; in the triboelectric or electrokinetic process, the principle of frictional electricity is utilized.

The powder coating material or the powder receives in the spray apparatus an electrostatic charge which is opposite to the charge of the friction partner, generally a hose or spray line made, for example, from polytetrafluoroethylene.

It is also possible to combine the two processes. Typical powder coating resins employed are epoxy resins, carboxyl- and hydroxyl-containing polyester resins, polyurethane resins and acrylic resins, together with the customary hardeners. Resin combinations are also used. For example, epoxy resins are frequently employed in combination with carboxyl-and hydroxyl-containing polyester resins.

Examples of typical hardener components for epoxy resins are acid anhydrides, imidazoles and dicyandiamide, and derivatives thereof. Examples of typical hardener components for hydroxyl-containing polyester resins are acid anhydrides, blocked isocyanates, bisacylurethanes, phenolic resins and melamine resins. For carboxyl-containing polyester resins, typical hardener components are, for example, triglycidyl isocyanurates or epoxy resins. Typical hardener components used in acrylic resins are, for example, oxazolines, isocyanates, triglycidyl isocyanurates or dicarboxylic acids.

The disadvantage of insufficient charging can be seen above all in triboelectrically or electrokinetically sprayed powders and powder coating materials which have been prepared using polyester resins, especially carboxyl-containing polyesters, or using so-called mixed powders, also referred to as hybrid powders. Mixed powders are taken to mean powder coating materials whose resin base comprises a combination of epoxy resin and carboxyl-containing polyester resin. The mixed powders form the basis for the powder coating materials used most commonly in practice. Inadequate charging of the abovementioned powders and powder coating materials results in an inadequate deposition rate and inadequate throwing power on the workpiece to be coated. The term "throwing power" is a measure of the extent to which a powder or powder coating material is deposited on the workpiece to be coated, including its rear faces, cavities, fissures and, in particular, its inner edges and corners.

It has additionally been found that charge control agents are able to improve considerably the charging and the charge stability properties of electret materials, especially electret fibers (DE-A-43 21 289). Electret fibers have hitherto been described mainly in connection with the problem of filtering very fine dusts. The filter materials described differ both in respect of the materials of which the fibers consist and with regard to the manner in which the electrostatic charge is applied to the fibers. Typical electret materials are based on polyolefins, halogenated polyolefins, polyacrylates, polyacrylonitriles, polystyrenes or fluoropolymers, for example polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates and mixtures thereof. Electret materials, especially electret fibers, can be used, for example, to filter (very fine) dusts. The electret materials can receive their charge in a variety of ways, for instance by corona or triboelectric charging.

It is additionally known that charge control agents can be used in electrostatic separation processes, especially in processes for the separation of polymers. For instance, using the example of the externally applied charge control agent trimethylphenylammonium tetraphenylborate, Y. Higashiyama et al. (J. Electrostatics 30 (1993), pp. 203–212) describe how polymers can be separated from one another for recycling purposes. Without charge control agents, the triboelectric charging characteristics of low-density polyethylene (LDPE) and high-density polyethylene (HDPE) are extremely similar. Following the addition of charge control agent, LDPE takes on a highly positive charge and HDPE a highly negative charge, and the materials can thus be separated easily. In addition to the external application of the charge control agents it is also possible to conceive in principle their incorporation into the polymer in order, for example, to shift the position of the polymer within the triboelectric voltage series and to obtain a corresponding separation effect. In this way it is likewise possible to separate other polymers, such as polypropylene (PP) and/or polyethylene terephthalate (PET) and/or polyvinyl chloride (PVC), from one another.

Salt minerals, for example, can likewise be separated with particularly good selectivity if they are surface-treated beforehand (surface conditioning) with an additive which improves the substrate-specific electrostatic charging (A. Singewald, L. Ernst, Zeitschrift fur Physikal. Chem., Neue Folge, Vol. 124, (1981) pp. 223–248).

Charge control agents are known from numerous literature references. However, the charge control agents known to date have a number of disadvantages, which severely limit their use in practice or even, in some cases, render it impossible; examples of such disadvantages are inadequate thermal instability, intrinsic odor, poor dispersibility or low stability in the toner binder (decomposition, migration). A particular weakness of many commercially available charge control agents is the inadequate activity in terms of the desired sign of the charge (positive or negative charging), charge level or charge constancy. A further important aspect is that charge control agents must be ecologically and toxicologically unobjectionable.

SUMMARY OF THE INVENTION

The object of the present invention was thus to find particularly effective and ecologically and toxicologically unobjectionable charge control agents. The intention is that the compounds should not only permit the rapid attainment and constancy of the charge but should also be of high thermal stability. Furthermore, these compounds should be readily dispersible, without decomposition, in various toner binders employed in practice, such as polyesters, polystyrene-acrylates or polystyrene-butadienes/epoxy resins and also cycloolefin copolymers. Furthermore, their action should be largely independent of the resin/carrier combination, in order to open up broad applicability. They should likewise be readily dispersible, without decomposition, in common powder coating binders and electret materials, such as polyester (PES), epoxy, PES-epoxy hybrid, polyurethane, acrylic systems and polypropylenes.

As regards electrostatic efficiency, the charge control agents should be effective at minimal concentration (1% or less) and not lose this efficiency in combination with carbon black or other colorants. This is because colorants are known to sometimes adversely affect the triboelectric charge of toners.

Surprisingly, it has now been found that specific aluminum azo complexes have good charge control properties and high thermal stability, the charge control property not being lost either as a result of combination with carbon black or other colorants. Furthermore, the compounds have good compatibility with the customary toner, powder coating material and electret binders and can be readily dispersed.

The present invention provides for the use of the 2:1 aluminum azo complex dyes of the formulae (I) and (I') below, individually or in combination as charge control agents in electrophotographic toners and developers, as charge improvers in powder coating materials, electret materials and in electrostatic separation processes and in inkjet inks and in color filters,

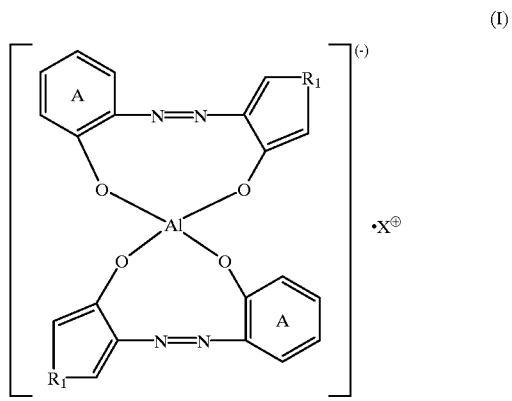

-continued

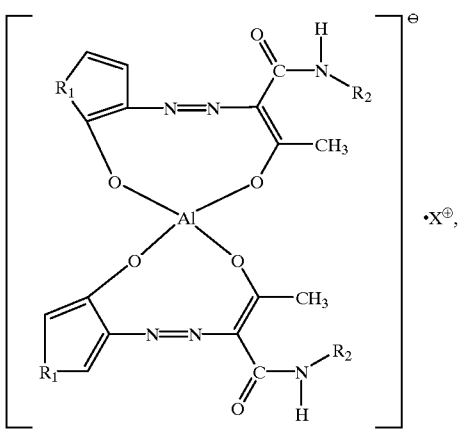

where the rings A, independently of one another, carry one or two substituents from the series consisting of $C_1$–$C_3$-alkyl, $C_1$–$C_3$-alkoxy, cyano, $C_1$–$C_3$-alkoxycarbonyl, benzoyl, phenoxycarbonyl, aminocarbonyl, mono- or di($C_1$–$C_4$-alkyl)aminocarbonyl, mono- or di($C_1$–$C_3$-alkoxy-$C_2$–$C_4$-alkyl)aminocarbonyl, phenylaminocarbonyl, aminosulfonyl, mono- or di($C_1$–$C_4$-alkyl)aminosulfonyl, mono- or di($C_1$–$C_3$-alkoxy-$C_2$–$C_4$-alkyl)aminosulfony and phenylaminosulfonyl;

all $R_1$, independently of one another are an atomic group necessary to complete a mono- or binuclear aromatic ring system, which group may optionally carry substituents; the two $R_2$ independently of one another are a phenyl radical optionally carrying substituents or a $C_1$–$C_{12}$-alkyl- or $C_1$–$C_2$-alkoxy-$C_2$–$C_8$-alkyl radical;

and $X^+$ is a cation.

DESCRIPTION OF THE PREFERRED EMBODIMENTS

Mono- or binuclear systems with an aromatic character are taken to mean, in particular, benzene, naphthalene and heterocyclic rings. The heterocyclic rings are taken to mean, in particular, the five-membered nitrogen-and/or sulfur-containing rings, especially pyrazolone or pyridone. Unless stated otherwise, suitable substituents on all rings with an aromatic character are any substituents known in dye chemistry, e.g. halogen, which is taken to mean especially chlorine or bromine, hydroxyl, $C_1$–$C_4$-alkyl, $C_1$–$C_4$-alkoxy, cyanogen, nitro, thiocyanogen, $C_1$–$C_3$-alkylcarbonyl, benzoyl, $C_1$–$C_3$-alkylcarbonyloxy, aminocarbonyl, mono- or di($C_1$–$C_4$-alkyl)aminocarbonyl, mono- or di($C_1$–$C_3$-alkoxy-$C_2$–$C_3$-alkyl)aminocarbonyl, $C_1$–$C_3$-alkoxycarbonyl, aminosulfonyl, mono- or di($C_1$–$C_4$-alkyl)aminosulfonyl and mono- or di($C_1$–$C_3$-alkoxy-$C_2$–$C_3$-alkyl)aminosulfonyl. The same substituents are also suitable for $R_2$ if it is a phenyl radical. However, preference is given in this case to halogen atoms, which are taken to include especially chlorine and bromine, $C_1$–$C_4$-alkyl, $C_1$–$C_4$-alkoxy or acetyl.

In the formulae (I) and (I') the symbols $R_1$ are the atomic groups necessary to complete a coupling component; in formula (I), in particular the atomic groups necessary to complete a benzolic or 1-phenyl-3-methylpyrazolyl coupling component. In formula (I') $R_1$ is preferably the atomic group necessary to complete a naphthalene or benzene ring. In particular, the benzene rings can optionally carry substituents, e.g. chlorine, bromine, $C_1$–$C_2$-alkyl, $C_1$–$C_2$-alkoxy, carboxamide or sulfonamide.

Suitable cations $X^+$ are, preferably, alkali metal ions, in particular sodium or potassium ions, ammonium, mono-, di- or tri($C_1$–$C_8$)-alkylammonium ions and especially 4-amino-, 4-hydroxy- or 4-keto-2,2,6,6-tetramethyl-piperidinium ions.

Specific examples of preferred dyes conform to the formulae (Ia), (Ib) and (Ic)

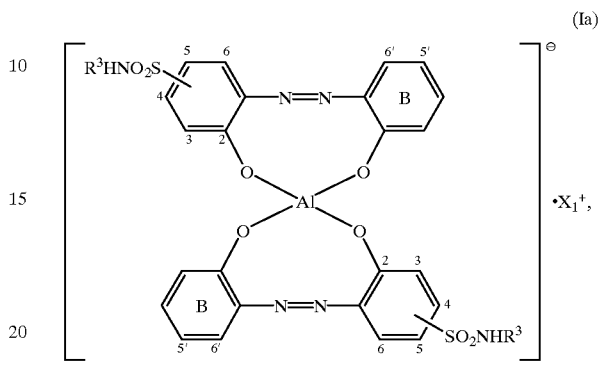

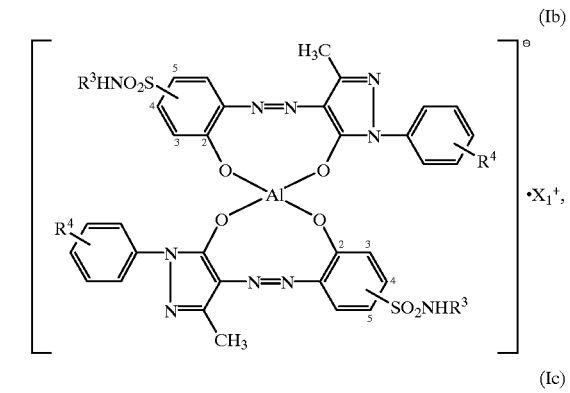

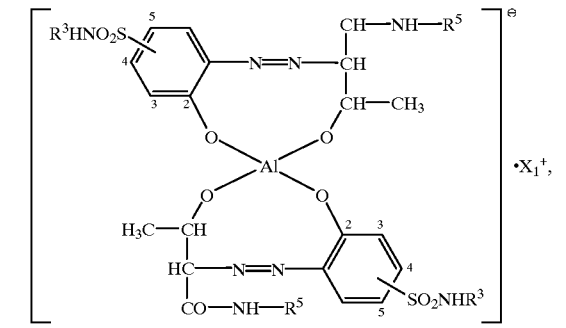

where, in these formulae, in each case independently of the other substituents, the two $R^3$ are hydrogen, $C_1$–$C_3$-alkyl, $C_1$–$C_2$-alkoxy-$C_2$–$C_3$-alkyl or phenyl, in particular methyl, ethyl, $C_1$–$C_2$-alkoxy-$C_2$–$C_3$-alkyl or phenyl;

$R^4$ is hydrogen, halogen, $C_1$–$C_2$-alkoxy, $C_1$–$C_2$-alkyl, preferably hydrogen, chlorine or methyl, in particular hydrogen;

the two R5 are in each case each a 2-ethylhexyl radical or a phenyl radical which can carry up to three substituents, including up to two from the group consisting of chlorine, bromine, $C_1$–$C_2$-alkyl, $C_1$–$C_3$-alkoxy or acetyl, preferably one or two $C_1$–$C_2$-alkoxy groups and/or a chlorine or bromine atom or a methyl group, in particular one or two methoxy groups; and $X^+$ is a sodium, potassium, ammonium or ($C_1$–$C_4$) alkylammonium ion, but in particular a 4-amino-, 4-hydroxy- or 4-keto-2,2,6,6-tetramethyl-piperidinium ion, the two rings B in the formula (Ia) can each carry one or two substituents, including in each case one from the group consisting of halogen, hydroxyl, $C_1$–$C_2$-alkyl, $C_1$–$C_3$-alkoxy, acetyl, benzoyl or 4,6-bis (2',4'-dimethylphenyl)triazin-2-ly, in particular in each case one hydroxyl and one acetyl or benzoyl group, or the rings B carry the atomic group necessary to complete a naphthalene ring, preferably bonded in the 5'-and 6'-position.

In the compounds of the formulae (Ia), (Ib) and (Ic) the sulfonamide groups are preferably bonded in each case in the 4- or 5-position.

The preparation of the compounds of the formula (I) is known from the literature, for example from U.S. Pat. No. 5,731,422, and is carried out in an analogous way to the preparation of similar, known 2:1 complex dyes by coupling a diazotized amine of the formula (II)

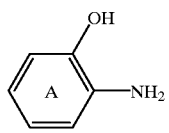
(II)

with a compound of the formula (III)

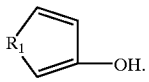
(III)

The dyes of the formula (I') are likewise prepared in an analogous manner to the preparation of similar, known 2:1 complex dyes by coupling a diazotized amine of the formula (II')

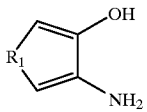
(II')

with a compound of the formula (III')

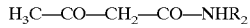
(III').

The metallization and the introduction of the cation can be carried out at the stage of the intermediates, i.e. compounds of the formulae (II), (III), (II') or (III'), or of the final products, likewise in a known manner.

The aluminum azo complexes used according to the invention can be matched exactly to the particular resin/toner system. Added to this, are the facts that the compounds used according to the invention are free-flowing and have high and particularly constant charge control properties, good thermal stabilities and good dispersibilities. A further technical advantage of these compounds is that they are inert toward the various binder systems and can therefore be employed widely, it being of particular importance that they are not dissolved in the polymer matrix, but are present as small, very finely dispersed solids. Dispersion means the distribution of one substance within another, i.e. in the context of the invention the distribution of a charge control agent in the toner binder, powder coating binder or electret material.

It is known that crystalline substances in their coarsest form are present as agglomerates. To achieve homogeneous distribution within the binder, these agglomerates must be disrupted by the dispersing operation into smaller aggregates or, ideally, into primary particles. The charge control agent particles present in the binder following dispersion should be smaller than 1 μm, preferably smaller than 0.5 μm, with a narrow particle size distribution being of advantage.

For the particle size, defined by the $d_{50}$ value, there are optimum ranges of activity depending on the material. For instance, coarse particles (~1 mm) can in some cases not be dispersed at all or can be dispersed only with a considerable investment of time and energy, whereas very fine particles in the submicron range harbor a heightened safety risk, such as the possibility of dust explosion.

The particle size and form is established and modified either by the synthesis and/or aftertreatment. The required property is frequently possible only through controlled aftertreatment, such as milling and/or drying. Various milling techniques are suitable for this purpose. Examples of advantageous technologies are air jet mills, cutting mills, hammer mills, bead mills and impact mills.

The binder systems mentioned in connection with the present invention are, typically, hydrophobic materials. High water contents in the charge control agent can either oppose wetting or else promote dispersion (flushing). The practicable moisture content is therefore specific to the particular material.

The compounds of the invention feature the following chemical/physical properties: The water content, determined by the Karl-Fischer method, is between 0.1% and 30%, preferably between 1 and 25% and, with particular preference, between 1 and 20%, it being possible for the water to be in adsorbed and/or bonded form, and for its proportion to be adjusted by the action of heat at up to 200° C. and reduced pressure down to $10^{-8}$ torr or by addition of water.

The particle size, determined by means of evaluation by light microscope, or by laser light scattering, and defined by the $d_{50}$ value, is between 0.01 μm and 1000 μm, preferably between 0.1 and 500 μm and, with very particular preference, between 0.2 and 400 μm.

It is particularly advantageous if milling results in a narrow particle size fraction. Preference is given to a range $\Delta(d_{95}d_{50})$ of less then 500 μm, in particular less than 200 μm.

The aluminum azo compounds used according to the invention can also be combined with charge control agents, providing either positive or negative control, in order to achieve good performance chargeabilities, the total concentration of these charge control agents being between 0.01 and 50% by weight, preferably between 0.1 and 5% by weight, based on the total weight of the electrophotographic toner, developer, powder or powder coating material.

Examples of suitable charge control agents are: triphenylmethanes; ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclically linked oligosaccharides (cyclodextrins) and derivatives thereof, especially boron ester derivatives, interpolyelectrolyte complexes (IPECs); polyester salts; benzimidazolones; azines, thiazines or oxazines which are listed in the Colour Index as Pigments, Solvent Dyes, Basic Dyes or Acid Dyes.

Particular preference is given to the charge control agents given below, which can be combined individually, or in combination with one another, with the dye of the formulae (1) or (1').

Triarylmethane derivatives, such as, for example: Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and the triarylmethane compounds listed in the Colour Index under Acid Blue and Basic Dye, provided their temperature stability and processability are suitable, such as Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with very particular suitability being possessed in turn by Colour Index Solvent Blue 125, 66 and 124.

A particularly suitable substance is Colour Index Solvent Blue 124 in the form of its highly crystalline sulfate or of the trichlorotriphenylmethyltetrachloroaluminate.

Other suitable triphenylmethanes are those described in U.S. Pat. No. 5,051,585, especially those of the formula (2)

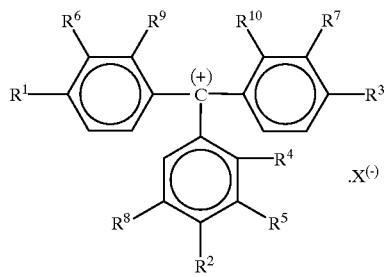

(2)

in which

R$^1$ and R$^3$ are identical or different and are —NH$_2$, a mono- or dialkylamino group whose alkyl groups have 1 to 4, preferably 1 or 2, carbon atoms, a mono- or di-omega-hydroxyalkylamino group, whose alkyl groups have 2 to 4, preferably 2, carbon atoms, an unsubstituted or N-alkyl-substituted phenyl amino or phenalkylamino group whose alkyl has 1 to 4, preferably 1 or 2, carbon atoms, whose phenalkyl group has 1 to 4, preferably 1 or 2, carbon atoms in the aliphatic bridge and whose phenyl ring may carry one or two of the following substituents: alkyl of 1 or 2 carbon atoms, alkoxy of 1 or 2 carbon atoms, and the sulfo group, R$^2$ is hydrogen or is as defined for R$^1$ and R$^3$, R$^4$ and R$^5$ are hydrogen, halogen, preferably chlorine, or a sulfo group, or R$^4$ together with R$^5$ forms a fused-on phenyl ring, R$^6$, R$^7$, R$^9$ and R$^{10}$ are each hydrogen or an alkyl radical of 1 or 2 carbon atoms, preferably methyl, and R$^8$ is hydrogen or halogen, preferably chlorine, and X$^-$ is a stoichiometric equivalent of an anion, especially a chloride, sulfate, molybdate, phosphoromolybdate or borate anion.

Particular preference is given to a charge control agent of the formula (2) in which R$^1$ and R$^3$ are phenylamino groups, R$^2$ is an m-methylphenylamino group and the radicals R$^4$ to R$^{10}$ are all hydrogen.

Also suitable are ammonium and immonium compounds as described in U.S. Pat. No. 5,015,676.

Further suitable compounds are the fluorinated ammonium and immonium compounds described in U.S. Pat. No. 5,069,994, especially those of the formula (3)

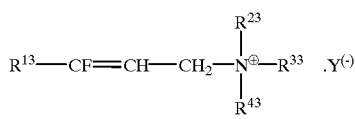

(3)

in which

R$^{13}$ is perfluorinated alkyl having 5 to 11 carbon atoms,

R$^{23}$, R$^{33}$ and R$^{43}$ are identical or different and are alkyl having 1 to 5, preferably 1 to 2, carbon atoms, and Y$^-$ is a stoichiometric equivalent of an anion, preferably of a tetrafluoroborate or tetraphenylborate anion.

Preferably,

R$^{13}$ is perfluorinated alkyl having 5 to 11 carbon atoms,

R$^{23}$ and R$^{33}$ are ethyl, and

R$^{43}$ is methyl.

Also suitable are biscationic acid amides, as described in WO 91/10172, especially those of the formula (4)

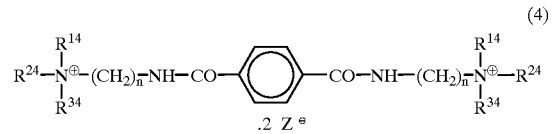

(4)

in which

R$^{14}$, R$^{24}$ and R$^{34}$ are identical or different alkyl radicals having 1 to 5 carbon atoms, preferably methyl, n is an integer from 2 to 5, and Z$^-$ is a stoichiometric equivalent of an anion, preferably a tetraphenylborate anion.

Further suitable compounds are diallylammonium compounds as described in DE-A A 142 541, especially those of the formula (5)

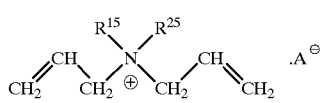

(5)

in which

R$^{15}$ and R$^{25}$ are identical or different alkyl groups having 1 to 5, preferably 1 or 2, carbon atoms, but in particular are methyl groups, and A$^-$ is a stoichiometric equivalent of an anion, preferably a tetraphenylborate anion, and the polymeric ammonium compounds, obtainable from said diallylammonium compounds, of the formula (6), as described in DE-A-4 029 652 or DE-A-4 103 610,

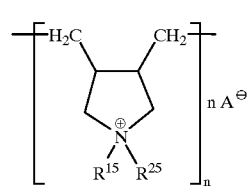

(6)

in which n has a value which corresponds to molecular weights of from 5000 to 500,000 g/mol. Particular preference, however, is given to compounds of the formula (6) having molecular weights of from 40,000 to 400,000 g/mol.

Also suitable are aryl sulfide derivatives, as described in DE-A-4 031 705, especially those of the formula (7)

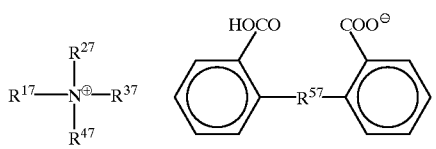

(7)

in which
R$^{17}$, R$^{27}$, R$^{37}$ and R$^{47}$ are identical or different alkyl groups having 1 to 5, preferably 2 or 3, carbon atoms, and
R$^{57}$ is one of the divalent radicals —S—, —S—S—, —SO— and —SO$_2$—.
For example, R$^{17}$ to R$^{47}$ are propyl groups and R$^{57}$ is the group —S—S—.

Also suitable are phenol derivatives, as described in EP-A-0 258 651, especially those of the formula (8)

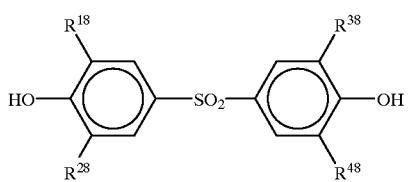

(8)

in which
R$^{18}$ and R$^{38}$ are alkyl or alkenyl groups having 1 to 5, preferably 1 to 3, carbon atoms, and R$^{28}$ and R$^{48}$ are hydrogen or alkyl having 1 to 3 carbon atoms, preferably methyl.

Examples that may be mentioned are the compounds in which R$^{18}$ to R$^{48}$ are methyl groups or in which R$^{28}$ and R$^{48}$ are hydrogen and R$^{18}$ and R$^{38}$ are the group —CH$_2$—CH=CH$_2$.

Further suitable compounds are phosphonium compounds and fluorinated phosphonium compounds, as described in U.S. Pat. No. 5,021,473 and in U.S. Pat. No. 5,147,748, especially those of the formulae (9)

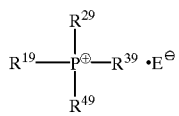

(9)

in which
R$^{19}$, R$^{29}$, R$^{39}$ and R$^{49}$ are identical or different alkyl groups having 1 to 8, preferably 3 to 6, carbon atoms and E$^\ominus$ is a stoichiometric equivalent of an anion, preferably a halide anion; and (10)

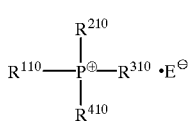

(10)

in which
R$^{110}$ is a highly fluorinated alkyl radical having 5 to 15, preferably 6 to 10, carbon atoms, and R$^{210}$, R$^{310}$ and R$^{410}$ are alkyl having 3 to 10 carbon atoms or are phenyl.

An example that may be mentioned of a compound of the formula (9) is tetrabutylphosphonium bromide; examples of compounds of the formula (10) that may be mentioned are the compounds where R$^{110}$=C$_8$F$_{17}$—CH$_2$—CH$_2$—, R$^{210}$=R$^{310}$=R$^{410}$=phenyl and E$^\ominus$=PF$_6^\ominus$ or the tetraphenylborate anion.

Also suitable are calix(n)arenes, as described in EP-A-0 385 580, especially those of the formula (11a) and (11b)

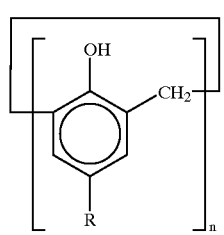

(11a)

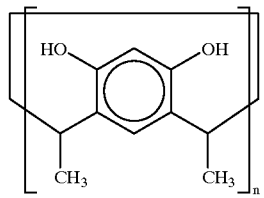

(11b)

in which
n is a number from 3 to 12 and
R is hydrogen, halogen, preferably chlorine, straight-chain or branched alkyl having 1 to 12 carbon atoms, aralkyl, e.g. benzyl or phenethyl, —NO$_2$, —NH$_2$ or NHR$^{111}$, where
R$^{111}$ is alkyl having 1 to 8 carbon atoms, unsubstituted or C$_1$-C$_4$-alkyl-substituted phenyl or —Si(CH$_3$)$_3$.

Also suitable are benzimidazolones, as described in EP-A-0 347 695, especially those of the formula (12)

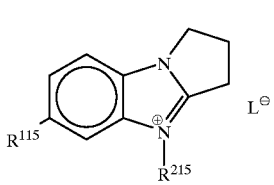

(12)

in which
R$^{115}$ is an alkyl having 1 to 5 carbon atoms and R$^{215}$ is an alkyl having 1 to 12 carbon atoms and L is a stoichiometric equivalent of an anion, especially a chloride or tetrafluoroborate anion.

An example which may be mentioned is the compound where R$^{115}$=CH$_3$ and R$^{215}$=C$_{11}$H$_{23}$.

Also suitable are cyclically linked oligosaccharides, as described in DE-A-4 418 842, especially those of the formula (13)

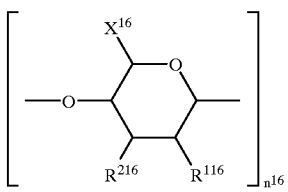

(13)

in which $n^{16}$ is a number between 3 and 100, $R^{116}$ and $R^{216}$ are defined as OH, $OR^{316}$, where $R^{316}$ is substituted or unsubstituted alkyl-($C_1$–$C_{18}$), aryl-($C_6$–$C_{12}$) or tosyl, and $X^{16}$ is defined as $CH_2OH$ or $CH_2COR^{316}$. Examples which may be mentioned are:

$n^{16}$=6, $R^{116}$ and $R^{216}$=OH, $X^{16}$=$CH_2OH$
$n^{16}$=7, $R^{116}$ and $R^{216}$=OH, $X^{16}$=$CH_2OH$
$n^{16}$=8, $R^{116}$ and $R^{216}$=OH, $X^{16}$=$CH_2OH$.

Other suitable compounds are polymer salts, as described in DE-A-4 332 170, whose anionic component is a polyester that consists of the reaction product of the individual components a), b) and c) and also, if desired, d) and, if desired, e), where a) is a dicarboxylic acid or a reactive derivative of a dicarboxylic acid, being free of sulfo groups, b) is a difunctional aromatic, aliphatic or cycloaliphatic sulfo compound whose functional groups are hydroxyl or carboxyl, or hydroxyl and carboxyl, c) is an aliphatic, cycloaliphatic or aromatic diol, a polyetherdiol or a polycarbonatediol, d) is a polyfunctional compound (functionality >2), whose functional groups are hydroxyl or carboxyl, or hydroxyl and carboxyl, and e) is a monocarboxylic acid and whose cationic component comprises hydrogen atoms or metal cations.

Also suitable are cyclooligosaccharide compounds, as described, for example, in DE-A-197 11 260, which are obtainable by reacting a cyclodextrin or cyclodextrin derivative with a compound of the formula

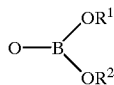

in which $R^1$ and $R^2$ are alkyl, preferably $C_1$–$C_4$-alkyl.

Suitability extends to interpolyelectrolyte complexes, as described, for example, in DE-A-197 32 995.

Also suitable, especially for liquid toners, are surface-active ionic compounds and so-called metal soaps.

Particularly suitable are alkylated arylsulfonates, such as barium petronates, calcium petronates, barium dinonylnaphthalenesulfonates (basic and neutral), calcium dinonylsulfonate or sodium dodecylbenzenesulfonate, and polyisobutylenesuccinimides (Chevron's Oloa 1200).

Also suitable are soya lecithin and N-vinylpyrrolidone polymers.

Also suitable are sodium salts of phosphated mono-and diglycerides having saturated and unsaturated substituents, AB diblock copolymers of A: polymers of 2-(N;N) dimethylaminoethyl methacrylate quaternized with methyl p-toluenesulfonate and B: poly-2-ethylhexyl methacrylate.

Also suitable, especially in liquid toners, are divalent and trivalent carboxylates, especially aluminum tristearate, barium stearate, chromium stearate, magnesium oleate, calcium stearate, iron naphthalite and zinc naphthalite.

Also suitable are azines of the following Color Index numbers: C.I. Solvent Black 5, 5:1, 5:2, 7, 31 and 50; C.I. Pigment Black 1, C.I. Basic Red 2 and C.I. Basic Black 1 and 2.

The aluminum azo complexes of the formula (I) or (I') used according to the invention and optionally additional charge control agents are incorporated individually or in combination with one another in a concentration of from 0.01 to 50% by weight, preferably from 0.5 to 20% by weight, particularly preferably from 0.1 to 5.0% by weight, based on the total mixture, into the binder of the respective toner, developer, coating, powder coating material, electret material or the polymer to be separated electrostatically or into the medium of an inkjet ink or the filter materials homogeneously, for example by extrusion or kneading, bead-milling or using an Ultraturrax (high-speed stirrer). The compounds used according to the invention can thus be added as dried and ground powders, dispersions or solutions, presscakes, masterbatches, preparations, made-up pastes, as compounds coated from aqueous or nonaqueous solution onto suitable supports, such as silica gel, $TiO_2$, $Al_2O_3$ or carbon black or mixed with such supports, or in some other form. In principle, the compounds used according to the invention can also be added as early as during the preparation of the respective binder, i.e. in the course of their polymerization, polyaddition or polycondensation.

The present invention also provides an electrophotographic toner comprising a customary binder, for example a styrene, styrene-acrylate, styrene-butadiene, acrylate, acrylic, polyester or epoxy resin or a combination of the last two, and from 0.01 to 50% by weight, preferably from 0.5 to 20% by weight, particularly preferably from 0.1 to 5% by weight, in each case based on the total weight of the electrophotographic toner, of at least one aluminum azo compound of the formula (I) or (I'), optionally in combination with one or more of the additional charge control agents described.

The present invention also provides a powder coating material comprising a customary binder, for example a urethane, acrylic, polyester or epoxy resin or a combination thereof, and from 0.01 to 50% by weight, preferably from 0.5 to 20% by weight, particularly preferably from 0.1 to 5% by weight, in each case based on the total weight of the powder coating material of at least one aluminum azo compound of the formula (I) or (I'), optionally in combination with one or more of the additional charge control agents described.

It has further been found that the aluminum azo compounds of the formula (I) or (I') are suitable as colorants in inkjet inks which are water-based (microemulsion inks) and nonwater-based ("solvent-based"), and in inks which operate in accordance with the hotmelt process.

Microemulsion inks are based on organic solvents, water and optionally an additional hydrotropic substance (interface promoter). Nonwater-based inks essentially comprise organic solvents and optionally a hydrotropic substance. Hotmelt inks are based mostly on waxes, fatty acids, fatty alcohols or sulfonamides which are solid at room temperature and liquefy when heated, the preferred melting range being between about 60° C. and about 140° C. The invention also provides a hotmelt inkjet ink consisting essentially of from 20 to 90% by weight of wax and from 1 to 10% by weight of the aluminum azo compound of the formula (I) or (I'). From 0 to 20% by weight of an additional polymer (as "dye solvent"), from 0 to 5% by weight of dispersion auxiliaries, from 0 to 20% by weight of viscosity modifiers, from 0 to 20% by weight of plasticizer, from 0 to 10% by weight of adhesion additives, from 0 to 10% by weight of transparency stabilizers (which prevents, for example, crystallization of the waxes) and from 0 to 2% by weight of an antioxidant may also be present. Typical additives and auxiliaries are described, for example, in U.S. Pat. No. 5,560,760.

The present invention also provides inkjet recording liquids which comprise one or more of the aluminum azo compounds of the formula (I) or (I').

The finished recording liquids generally comprise a total of from 0.5 to 15% by weight, preferably from 1.5 to 8% by weight, (calculated on a dry basis) of one or more, e.g. 2 or 3, of the compounds of the formula (I) or (I').

Microemulsion inks comprise from 0.5 to 15% by weight, preferably from 1.5 to 8% by weight, of a compound of the formula (I) or (I'), from 5 to 99% by weight of water and from 0.5 to 94.5% by weight of an organic solvent and/or hydrotropic compound.

"Solvent-based" inkjet inks preferably comprise from 0.5 to 15% by weight of a compound of the formula (I) or (I'), from 85 to 94.5% by weight of an organic solvent and/or hydrotropic compounds.

Water used for the preparation of the recording liquids is preferably used in the form of distilled or demineralized water.

The solvents present in the recording liquids may comprise an organic solvent or a mixture of such solvents. Examples of suitable solvents are mono- or polyhydric alcohols, their ethers and esters, e.g. alkanols, especially those having from 1 to 4 carbon atoms, such as methanol, ethanol, propanol, isopropanol, butanol, isobutanol; di- or trihydric alcohols, especially those having from 2 to 5 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ethers and triethylene glycol monomethyl or monoethyl ethers; ketones and ketone alcohols such as acetone, methyl ethyl ketone, diethyl ketone, methyl isobutyl ketone, methyl pentyl ketone, cyclopentanone, cyclohexanone, diacetone alcohol; amides, such as dimethylformamide, dimethylacetamide, N-methylpyrrolidone, toluene and n-hexane.

Examples of hydrotropic compounds, which can if desired also serve as solvents, are formamide, urea, tetramethylurea, c-caprolactam, ethylene glycol, diethylene glycol, triethylene glycol, polyethylene glycol, butyl glycol, methylcellosolve, glycerol, N-methylpyrrolidone, 1,3-diethyl-2-imidazolidinone, thiodiglycol, sodium benzenesulfonate, Na-xylenesulfonate, Na toluenesulfonate, sodium cumenesulfonate, Na-dodecylsulfonate, Na-benzoate, Na-salicylate or sodium butyl monoglycol sulfate.

The recording liquids according to the invention may also comprise further customary additives, for example preservatives, cationic, anionic or nonionic surface-active substances (surfactants and wetting agents), and also viscosity regulators, such as polyvinyl alcohol, cellulose derivatives, or water-soluble natural or synthetic resins as film formers or binders for enhancing the adhesive strength and abrasion resistance.

Amines, such as ethanolamine, diethanolamine, triethanolamine, N,N-dimethylethanolamine or diisopropylamine, serve predominantly to raise the pH of the recording liquid. They are normally present in the recording liquid in amounts from 0 to 10% by weight, preferably from 0.5 to 5% by weight.

The inkjet inks according to the invention can be prepared by dispersing the aluminum azo compound of the formula (I) or (I') as powder, as preparation, as suspension or as presscake into the microemulsion medium or into the non-aqueous medium or into the wax to prepare a hotmelt inkjet ink. The presscake can also be a highly concentrated presscake, in particular a spray-dried presscake.

Furthermore, the metal complex of the formula (I) and (I') is also suitable as colorant for color filters, for both subtractive and for additive color generation (P. Gregory "Topics in Applied Chemistry: High Technology Application of Organic Colorants" Plenum Press, New York 1991, pp. 15–25).

In the examples which follow, parts and percentages are by weight.

EXAMPLES

Preparation Examples for Aluminum Azo Complex Compounds

Preparation Example 1

26.0 parts of 2-aminophenol-4-(3'-methoxypropylaminosulfonyl) are stirred into a mixture of 200 parts of water and 70 parts of 30% HCL. After 50 parts of ice have been added, the amine is diazotized by adding 26.2 parts by volume of 4n NaNO$_2$ solution. The resulting suspension is stirred for 3 hours at 0° C. and then slowly run into a solution of 13.7 parts of β-naphthol in 190 parts of water and 9.5 parts of 30% NaOH solution.

By simultaneously adding a further 70 parts of 30% NaOH solution, the pH is maintained at from 9.5 to 10. The resulting mixture is then stirred for 8 hours at room temperature, then adjusted to pH 1.5 using 30% HCl, and the monoazo dye of the formula

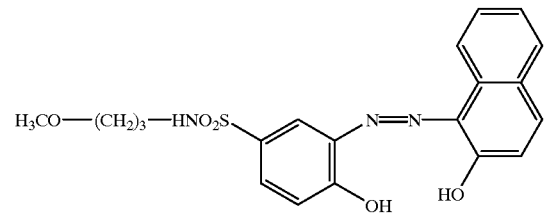

which has formed is filtered off, washed with 4000 parts of water and dried.

44.19 parts of the monoazo dye are suspended in a mixture of 110 parts of water and 25 parts of 30% strength NaOH solution, heated to 70° C. and stirred for 1 hour. The pH of the suspension is 12.3. After further heating to 90° C., a solution of 17.1 parts of aluminum sulfate (anhydrous) in 340 parts of water is added over the course of 1 hour, and a voluminous suspension of the aluminum complex forms and the pH drops to 10.9. With stirring for 2 hours the temperature is allowed to drop to 45° C., and a solution of 8.58 parts of triacetonediamine in 10 parts of water and 11.2 parts of 30% HCl is slowly added to the suspension. The precipitate which forms is adjusted to pH 5.4 using about 2.4 parts of 30% HCl, stirred for a further hour at room temperature and filtered, and the residue is washed with water until free from salt, dried and ground on a suitable mill. This gives the dye of the formula (Ia), in which R$^3$ is methoxypropyl, the ring B is naphthylene and the sulfonamide group is in each case bonded in the 5-position.

Characterization
Red-blue powder

| | |
|---|---|
| DTA: | Softening at 160–185° C., decomposition from 250° C. |
| pH: | 8.7 |
| Conductivity | 400 μS/cm |
| Residual moisture | 5.1% (IR lamp) |
| $\epsilon$ (1 Khz) | 6 |
| tan$\sigma$ (1 Khz) | 0.3 |
| $\Omega$cm | $8 \cdot 10^{12}$ $\Omega$cm |
| Crystallinity | crystalline, numerous sharp reflection peaks between 2 theta 5° and 2 theta 35° (main peaks: 21.7° and 8.7°) |
| Particle size distribution: | $d_{50} < 10$ μm |

Preparation Example 2

Following the procedure of Preparation example 1, equimolar amounts (12.12 parts) of 2-hydroxy-3-methylaminosulfonylaniline are diazotized, coupled with 10.45 parts of 1-phenyl-3-methyl-5-pyrazolone, and reacted with aluminum sulfate, 30% strength sodium hydroxide solution and triacetonediamine chlorohydrate to give the corresponding 2:1 aluminum complex dye of the formula (Ib), in which $R^3$ is methyl and $R^4$ is hydrogen and the sulfonamide group is bonded in the 4-position.

Characterization
Yellow-red powder

| | |
|---|---|
| DTA: | Softening at 200–210° C., decomposition from 260° C. |
| pH: | 7.5 |
| Conductivity | 500 μS/cm |
| Residual moisture | 6.6% (IR lamp) |
| $\epsilon$ (1 Khz) | 8.7 |
| tan$\sigma$ (1 Khz) | 0.2 |
| $\Omega$cm | $2 \cdot 10^{11}$ $\Omega$cm |
| Crystallinity | crystalline, numerous sharp bands between 2 theta 5° and 2 theta 35° (main peaks: 11.1° to 14.4° and 17.7°) |
| Particle size distribution: | $d_{50} < 10$ μm |
| IR spectrum: | 1587, 1568, 1474, 1303 cm$^{-1}$. |

Application Examples

Application Example 1.1

1 part of the compound from Preparation example 1 is incorporated homogeneously by means of a kneader into 95 parts of a toner binder (polyester based on bisphenol A, ®Almacryl T500) over a period of 30 min. The mixture is subsequently ground on a universal laboratory mill and then classified in a centrifugal classifier. The desired particle fraction (from 4 to 25 μm) is activated with a carrier consisting of silicone-coated ferrite particles having a size of from 50 to 200 μm (bulk density 2.75 g/cm$^3$)
(FBM 96-100; Powder Techn.)

Measurement takes place on a conventional q/m measurement setup. A screen with a mesh size of 25 μm is used to ensure that, when the toner is blown out, no carrier is ejected with it. The measurements are carried out at about 50% relative atmospheric humidity. As a function of the activation period, the following q/m values [μC/g] are measured:

| Activation period | Charge q/m [μC/g] |
|---|---|
| 5 min | −22 |
| 10 min | −25 |
| 30 min | −25 |
| 2 h | −25 |
| 24 h | −22 |

Application Example 1.2

The procedure of Application example 1.1 is used although, instead of one part, five parts of the compound from Preparation example 1 are incorporated.

As a function of the activation period, the following q/m values [μC/g] are measured:

| Activation period | Charge q/m [μC/g] |
|---|---|
| 5 min | −35 |
| 10 min | −34 |
| 30 min | −29 |
| 2 h | −22 |
| 24 h | −18 |

Application Example 1.3

1 part of the compound from Preparation example 1 is incorporated into a toner resin as in Application example 1.1 and measured, but using a styrene-acrylate copolymer 60:40 (®Dialec S309, Diamond Shamrock) instead of the polyester resin as toner binder, and using magnetite particles of size 50–200 μm coated with styrene-methacrylic copolymer (90:10) (90 μm Xerographic Carrier, Plasma Materials Inc., NH, USA) as carrier.

As a function of the activation period, the following q/m values are measured:

| Activation period | q/m [μC/g] |
|---|---|
| 5 min | −12 |
| 10 min | −25 |
| 30 min | −44 |
| 2 h | −55 |
| 24 h | −55 |

Application Example 1.4

The procedure is as in Application example 1.3, but using instead of 1 part, only 0.5 20 part of the compound from Preparation example 1.

As a function of the activation period, the following q/m values are measured:

| Activation Period | q/m [μC/g] |
|---|---|
| 5 min | −13 |
| 10 min | −15 |
| 30 min | −34 |

-continued

| Activation Period | q/m [µC/g] |
|---|---|
| 2 h | −40 |
| 24 h | −40 |

Application Example 1.5

The procedure is as in Application example 1.3, where 5 parts of carbon back (®Mogul L, Cabot, see Comparative Example A) are also incorporated into the one part of the compound from Preparation example 1.

As a function of the activation period, the following q/m values are measured:

| Activation Period | q/m [µC/g] |
|---|---|
| 5 min | −20 |
| 10 min | −23 |
| 30 min | −25 |
| 2 h | −25 |
| 24 h | −22 |

Application example 1.6

1 part of the compound from Preparation example 2 is incorporated homogeneously as described in Application example 1.1 into 99 parts of a powder coating material binder based on a carboxyl-containing polyester resin, e.g. ®Crylcoat 430 (UCB, Belgium).

To determine the deposition rate, 50 g of the test powder coating material are sprayed through a triboelectric gun at a defined pressure. The amount of powder coating material deposited can be determined by differential weighing, and a deposition rate in % defined, and it is also possible to derive a current flow [µA] from the charge transfer.

| Pressure [bar] | Current [µA] | Deposition rate [%] |
|---|---|---|
| 5 | 0.6 | 75 |
| 3 | 0.4 | 55 |

Comparative Example

To determine the deposition rate of the pure powder coating material binder ®Crylcoat 430, the procedure is as described above, but without kneading in an additive

| Pressure [bar] | Current [µA] | Deposition rate [%] |
|---|---|---|
| 3 | 0.1 | 5 |

Application Example 1.7

6 parts of the compound from Preparation example 1 are dissolved in 94 parts of methyl ethyl ketone with stirring (pedal stirrer or dissolver). The resulting inkjet ink has the composition 6 parts of the compound from Preparation example 1 94 parts of methyl ethyl ketone.

Application Example 1.8

5 parts of the compound from Preparation example 1 are dissolved in 30 parts of glycol ether (Dowanol Eph, Dow Chemical) with stirring.

This solution is then added with stirring to a solution of 50 parts of deionized water containing 15 parts of xylenesulfonate.

The resulting microemulsion ink has the composition 30 parts of glycol ether 5 parts of the compound from Preparation example 1

15 parts of xylenesulfonate (interface promoter, hydrotropic substance)

50 parts of deionized water.

Application Example 2.1

The procedure is as in Application example 1.1, but instead of one part of the compound from Preparation example 1, now 1 part of the compound from Preparation example 2 was incorporated.

As a function of the activation period, the following q/m values are measured:

| Activation Period | q/m [µC/g] |
|---|---|
| 5 min | −17 |
| 10 min | −17 |
| 30 min | −17 |
| 2 h | −18 |
| 24 h | −16 |

Application Example 2.2

The procedure is as in Application example 1.3, but instead of one part of the compound from Preparation example 1, now 1 part of the compound from Preparation example 2 was incorporated.

As a function of the activation period, the following q/m values are measured:

| Activation Period | Charge q/m [µC/g] |
|---|---|
| 5 min | −15 |
| 10 min | −30 |
| 30 min | −48 |
| 2 h | −48 |
| 24 h | −39 |

Application Example 2.3

The procedure is as in Application example 2.2, but instead of one part, only 0.5 part of the compound from Preparation example 2 is incorporated.

As a function of the activation period, the following q/m values are measured:

| Activation Period | Charge q/m [µC/g] |
|---|---|
| 5 min | −13 |
| 10 min | −20 |
| 30 min | −36 |
| 2 h | −40 |
| 24 h | −31 |

Application Example 2.4

The procedure is as in Application example 2.2, but 5 parts of carbon black (Mogul L. Cabot, see Comparative Example A) are also incorporated into the one part of the compound from Preparation example 2.

As a function of the activation period, the following q/m values are measured:

| Activation Period | Charge q/m [$\mu$C/g] |
|---|---|
| 5 min | −30 |
| 10 min | −40 |
| 30 min | −40 |
| 2 h | −36 |
| 24 h | −20 |

Application Example 2.5

The procedure is as in Application example 2.2, but 5 parts of a colorant with an inherent electrostatic positive triboelectric effect (C.I. Solvent Blue 125, see Comparative Example B) were also incorporated into the one part of the compound from Preparation example 2.

As a function of the activation period, the following q/m values are measured:

| Activation Period | Charge q/m [$\mu$C/g] |
|---|---|
| 5 min | −5 |
| 10 min | −4 |
| 30 min | −3 |
| 2 h | −4 |
| 24 h | −5 |

The inherent high positive triboelectric effect of C.I. Solvent Blue 125 can be clearly reversed to negative by adding one part of the compound from Preparation example 2, the negative charge then also still having an amazingly good charge constancy as a function of the activation period.

Application Example 2.6

6 parts of the compound from Preparation example 2 are dissolved in 94 parts of methyl isobutyl ketone with stirring.

The resulting inkjet ink has the composition 6 parts of the compound from Preparation example 2

94 parts of methyl isobutyl ketone

Application Example 2.7

3 parts of the compound from Preparation example 2 are dissolved in 15 parts of glycol ether (Dowanol Eph) with stirring.

This solution is then added with stirring to a solution of 74 parts of deionized water containing 15 parts of xylenesulfonate (Witco Surfactants, Germany).

The resulting microemulsion ink has the composition 15 parts of glycol ether 3 parts of the compound from Preparation example 2

8 parts of xylenesulfonate 74 parts of deionized water.

Comparative Example A: to Application example 1.5 and 2.4

The procedure is as in Application example 1.3 but, instead of 1 part of the compound from Preparation example 1, five parts of carbon black Mogul L. Cabot are incorporated.

As a function of the activation period, the following q/m values are measured:

| Activation Period | Charge q/m [$\mu$C/g] |
|---|---|
| 5 min | −16 |
| 10 min | −16 |
| 30 min | −15 |
| 2 h | −9 |
| 24 h | +3 |

It is apparent that the carbon black used shifts the negative charge toward positive.

Comparative Example B to Application example 2.5

The procedure is as described in Application example 1.3, but instead of one part of the compound from Preparation example 1, five parts of C.I. Solvent Blue 125 are incorporated.

As a function of the activation period, the following q/m values are measured:

| Activation period | Charge q/m [$\mu$C/g] |
|---|---|
| 5 min | −29 |
| 10 min | −28 |
| 30 min | −19 |
| 2 h | −8 |
| 24 h | +9 |

The inherent, pronounced positive triboelectric effect of the blue colorant is clear.

What is claimed is:

1. A method of coloring and improving the charge of electrophotographic toners and developers, powder coating materials, electret materials, inkjet inks and color filters, comprising adding a 2:1 aluminum azo complex dye to a binder of said electrophotographic toner or developer, powder coating material or electret material, to a color filter or an inkjet ink base, wherein the 2:1 aluminum azo complex dye has the formula (Ia), (Ib) or (Ic), (Ia)

-continued

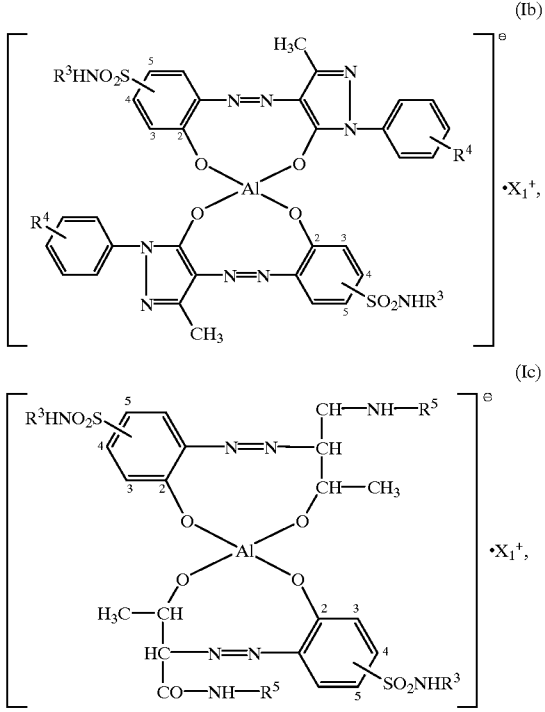

where the two R³, independently of one another, are hydrogen, $C_1$–$C_3$-alkyl, $C_1$–$C_2$-alkoxy $C_2$–$C_3$-alkyl or phenyl;

R⁴ is hydrogen, halogen, $C_1$–$C_2$-alkoxy or $C_1$–$C_2$-alkyl;

the two R⁵, independently of one another, a 2-ethylhexyl radical or a phenyl radical which optionally carries up to three substituents, including up to two from the group consisting of chlorine, bromine, $C_1$–$C_2$-alkyl, $C_1$–$C_3$-alkoxy or acetyl;

$X_1^+$ is a sodium, potassium, ammonium or ($C_1$–$C_4$) alkylammonium ion, and where the two rings B in the formula (Ia) can each carry one or two substituents, including in each case one from the group consisting of halogen, hydoxyl, $C_1$–$C_2$-alkyl, $C_1$–$C_3$-alkoxy, acetyl, benzoyl or 4,6-bis(2',4'-dimethylphenyl)-triazin-2-yl, or the rings B carry the atomic group necessary to complete a naphthalene ring.

2. The method as claimed in claim 1, wherein the groups of the formula $SO_2NHR^3$ in the compounds of the formula (Ia), (Ib) and (Ic) are in the 4- or 5-position.

3. The method as claimed in claim 1, wherein the cation X⁺ or $X_1^+$ is 4-amino-2,2,6,6-tetramethylpiperidinium, 4-hydroxy-2,2,6,6-tetramethylpiperidinium or 4-keto-2,2,6, 6-tetramethylpiperidinium.

4. The method as claimed in claim 1, wherein a further charge control agent providing positive or negative control is added.

5. The method as claimed in claim 4, wherein the further charge control agent is selected from the group consisting of triphenylmethanes; ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclically linked oligosaccharides and derivatives thereof, in particular boron ester derivatives, interpolyelectrolyte complexes; polyester salts; benzimidazolones; azines, thiazines and oxazines.

6. The method as claimed in claim 1, wherein the total concentration of 2:1 aluminum azo complex dye of the formula (Ia), (Ib) or (Ic) is from 0.01 to 50% by weight, based on the total mixture of the electrophotographic toner, developer, powder coating material, electret material or inkjet ink.

7. The method as claimed in claim 4, wherein the total concentration of 2:1 aluminum azo complex dye of the formula (Ia), (Ib) or (Ic) and the further charge control agent is from 0.01 to 50% by weight, based on the total mixture of the electrophotographic toner, developer, powder coating material, electret material or inkjet ink.

8. An electrophotographic toner comprising an aluminum azo compound of the formula (Ia), (Ib) or (Ic) as claimed in claim 1, and optionally a further charge control agent, in a concentration of from 0.01 to 50% by weight, based on the total weight of the toner, and a toner binder.

9. A powder coating material comprising an aluminum azo compound of the formula (Ia), (Ib) or (Ic) as claimed in claim 1, and optionally a further charge control agent in a concentration of from 0.01 to 50% by weight, based on the total weight of the powder coating material, and a powder coating material binder.

10. An inkjet recording liquid comprising from 0.5 to 15% by weight of an aluminum azo compound of the formula (Ia), (Ib) or (Ic) as claimed in claim 1.

11. The inkjet recording liquid as claimed in claim 10, comprising from 5 to 99% by weight of water and from 0.5 to 94.5% by weight of an organic solvent and optionally a hydrotropic compound.

12. An inkjet recording liquid as claimed in claim 10, comprising from 85 to 94.5% by weight of an organic solvent and optionally a hydrotropic compound.

13. A hotmelt inkjet ink, consisting essentially of from 20 to 90% by weight of wax which melts between 60 and 140° C., and from 1 to 10% by weight of the aluminum azo compound of the formula (Ia), (Ib) or (Ic) as claimed in claim 1.

* * * * *